United States Patent

[11] 3,596,368

[72] Inventors Zdenek Zacpal
Horni Mostenice;
Petr Nemecek, Prerov, both of,
Czechoslovakia
[21] Appl. No. 878,754
[22] Filed Nov. 21, 1969
[45] Patented Aug. 3, 1971
[73] Assignee Prerovske strojurny, narodni podnik
Prerov, Czechoslovakia

[54] ARRANGEMENT FOR PREHEATING OF PULVERULENT MATERIALS PARTICULARLY OF CEMENT RAW MATERIAL
5 Claims, 6 Drawing Figs.

[52] U.S. Cl. .................................................. 34/57,
263/21, 263/32
[51] Int. Cl. ............................................. F26b 17/14,
F27b 15/12
[50] Field of Search ........................................... 263/21 R,
21 A, 32; 34/57 R, 57 A, 57 D, 57 E

[56] References Cited
UNITED STATES PATENTS

| | | | |
|---|---|---|---|
| 2,658,615 | 11/1953 | Ebersole ........................ | 34/57 D X |
| 3,102,719 | 9/1963 | Zacpal et al. ................... | 34/57 X |
| 3,135,588 | 6/1964 | Helming ......................... | 34/57 E |

*Primary Examiner*—Charles J. Myhre
*Attorneys*—Richard Low and Murray Schaffer

ABSTRACT: A shaft heat exchanger for pulverulent materials, with hot gases supplied at the bottom of the shaft and with the material to be preheated supplied at the top, is provided at the top of the shaft with a fan, serving simultaneously for generating an upward draft of the gases and for separating of particles of the preheated material entrained by the upstreaming gases. The material is supplied through the hollow shaft of said fan and is dropped on a distributing disc forming a unit with the fan wheel.

INVENTOR
ZDENEK ZACPAL
BY PETR NEMECEK

ATTORNEY

ARRANGEMENT FOR PREHEATING OF PULVERULENT MATERIALS PARTICULARLY OF CEMENT RAW MATERIAL

BACKGROUND OF THE INVENTION

The invention relates to an arrangement for preheating of pulverulent materials, particularly of cement raw material for dry-burning of cement clinker in a rotary kiln.

The preheating of pulverulent materials like cement raw material prior to their burning in a rotary kiln is generally accomplished in preheating units, connected with the input end of the rotary kiln. In recent times preheaters of the shape of vertical preheating shafts are frequently used, connected at the bottom via a conduit for the supply of hot gases with the rotary kiln, terminating at the bottom of the shaft above a conical discharge hopper.

The material to be preheated is generally supplied into the upper part of the shaft, provided with a rotary separator shutter with a distributing disk. The raw material is distributed by the distributing disk into the stream of hot gases, proceeds downwards in a direction opposite to the flow of hot gases and is thus preheated. The particles of raw material entrained by the gas stream in the shaft are continuously caught by the rotating separating shutter and returned into the space of the shaft. The rotating separating shutter rotates either by means of a special electric motor or directly by the action of the upstreaming gases. In both cases a substantial power is required both for the turning of the shutter and for the passage of gases, which power is solely used for separating of entrained particles. The rotating shutter therefore behaves like a resistance which must be overcome by the supplied power. There is no difference whether the power is supplied by a special electric motor or by an increase of the power consumption of the fan of the kiln.

In consequence thereof the power supply for separating the entrained powder particles is higher than the power required for passage of gases through the kiln and through the proper preheating shaft.

SUMMARY OF THE INVENTION

It is an object of this invention to reduce the power supply required for passage of gases and for separating powder particles entrained by the upstreaming gases.

It is another object of this invention to achieve an efficient preheating of the powder material and to receive gases leaving the preheater free of powder particles.

In accordance with this invention the top of the preheating shaft consists of a fan wheel with a vertical rotation axis, provided with blades having collecting slots inclined with respect to the circumference of the fan wheel for returning the powder material back into the shaft and with a distributing disk fixed on the shaft of the fan wheel below said fan wheel.

DESCRIPTION OF THE DRAWINGS

Exemplary embodiments of the object of this invention are illustrated in the accompanying drawings, where.

DESCRIPTION OF PREFERRED EMBODIMENTS

Figure 1:
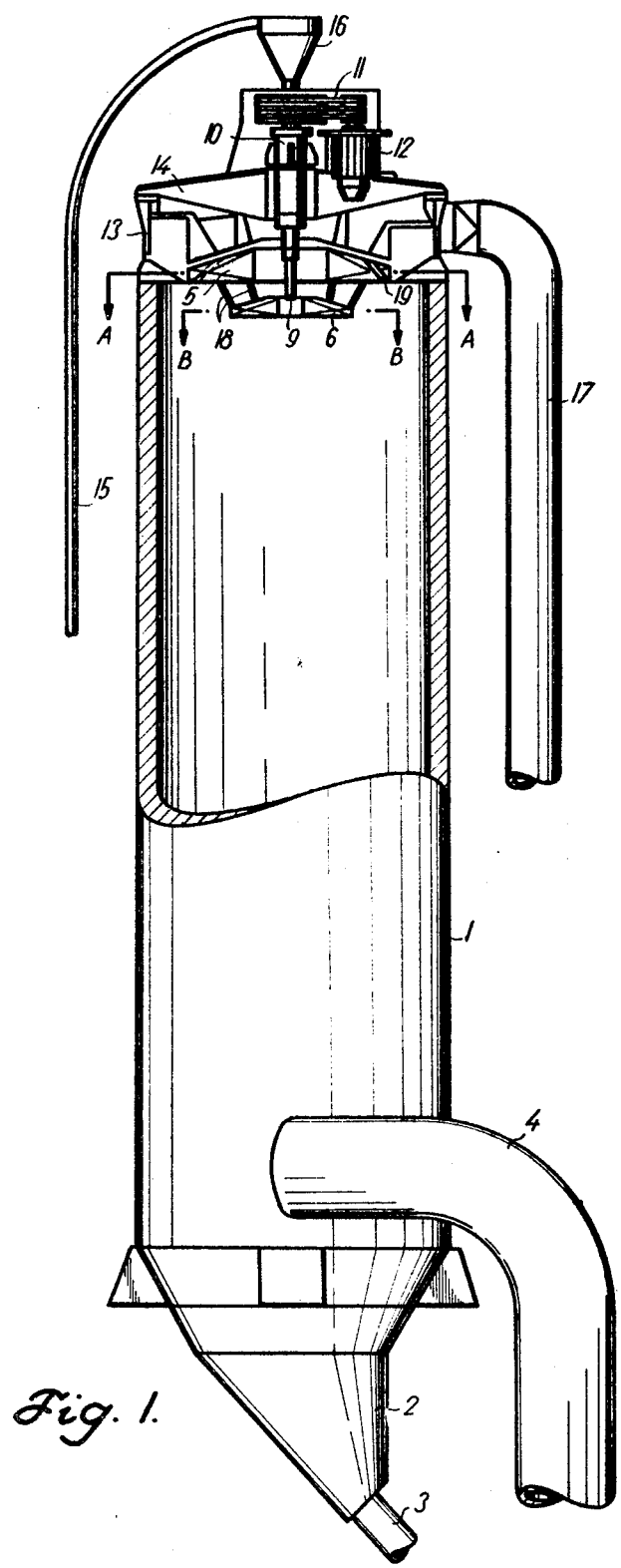
FIG. 1 is a schematical elevation of the arrangement with parts in vertical section.
Figure 2:
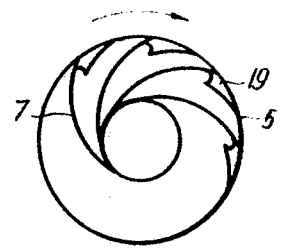
FIG. 2 is a top view in section along the line A-A in FIG. 1.
Figure 3:
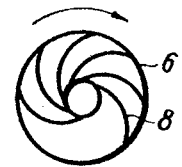
FIG. 3 is a top view in section along the line B-B in FIG. 1.

With reference to FIGS. 1 to 3 a fan wheel 5 and a distributing disk 6 are fixed on a vertical hollow shaft 9 in the upper part of the preheating shaft 1. The distributing disk 6 is connected with the fan wheel 5 additionally by struts 18. The hollow shaft 9 is rotatably mounted by roller bearings in the bearing body 10 and is driven by way of a transmission 11 by an electric motor 12. The bottom outlet of an expansion vessel 16 with a supply tube 15 for the supply of the raw material, connected tangentially into said vessel, terminates into the hollow shaft 9.

The bearing body 10 and the electric motor 12 are supported by a frame 14 mounted on a spiral case 13 on top of the preheating shaft 1.

Each blade 7 of the fan wheel 5 is provided near the external circumference of the fan wheel 5 with a collecting channel 19, inclined with respect to the external circumference of the fan wheel 5 and open in its lower part into the space of the preheating shaft 1. The distributing disk 6 is provided with distributing blades 8.

An inlet channel 4 for gases terminates tangentially in the lower cylindrical part of the preheating shaft 1. The bottom of the preheating shaft 1 is formed by a conical hopper 2, connected by a discharge conduit 3 with a rotary kiln, not shown on the drawings.

Figure 4:
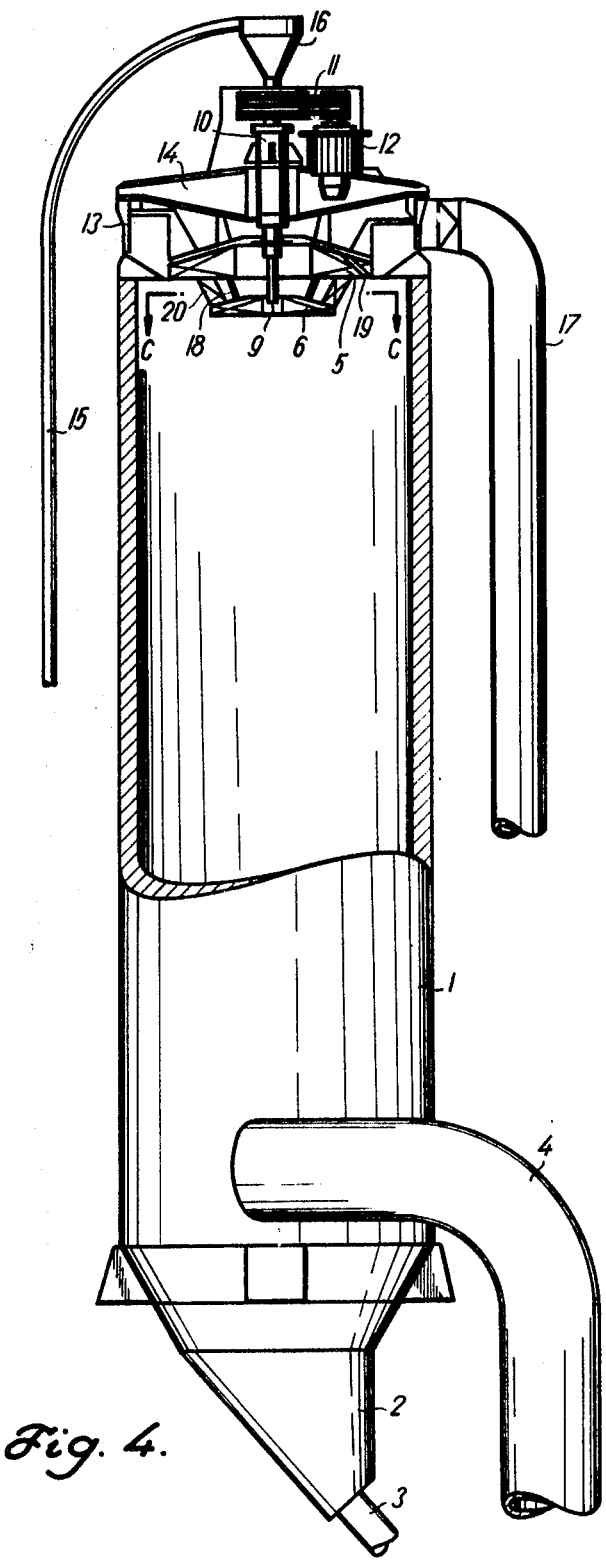
FIG. 4 is an elevation of an alternative arrangement with parts in vertical section.
Figure 5:
FIG. 5 is a top view in section along the line C-C in FIG. 4.

In the alternative arrangement in FIGS. 4 and 5 the external struts 18 between the fan wheel 5 and the distributing disk 6 are replaced by separating blades 20.

Figure 6:
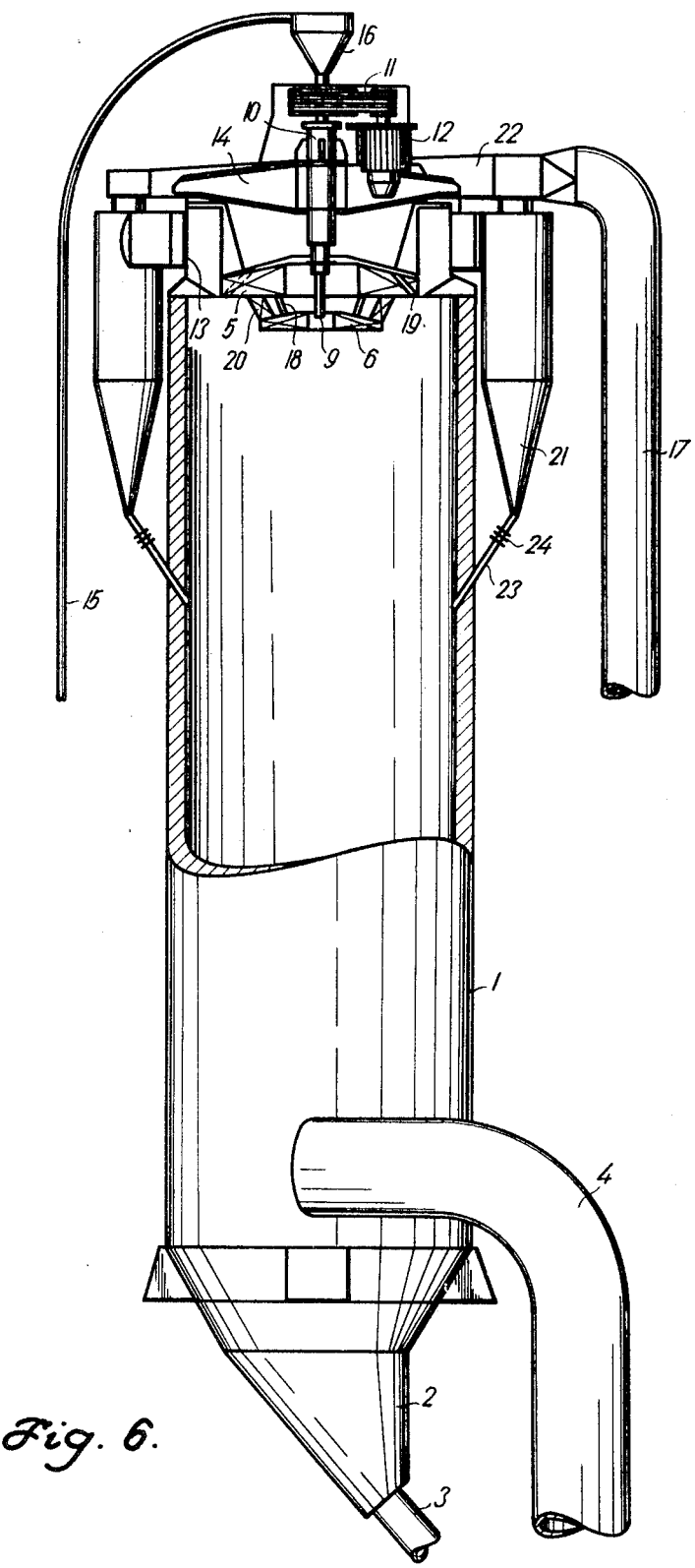
FIG. 6 is an elevation of another alternative arrangement with parts in vertical section.

In the alternative arrangement in FIG. 6 cyclone separators 21 are connected to the lateral wall of the spiral case 13, the gas outlet flanges of which are connected with the outlet conduit 17 by way of a collecting channel 22. The discharge flanges of the cyclone separators 21 are connected with the operating space of the preheating shaft 1 by conduits 23, provided with closures 24.

There is also another design possible, which is not shown on the drawings, with cyclone separators according to FIG. 6 but without the separating blades 20.

The structure operates as follows:

According to the alternative in FIG. 1 to 3 the raw material is supplied via the supply tube 15 into the expansion vessel 16, where it receives due to the tangential inlet a rotary movement and drops through the hollow shaft 9 on the rotating distributing disk 6.

The distributing disk 6 and the fan wheel 5 receive their rotating movement from the electric motor 12 over the transmission 11. The distributing blades 8 disperse perfectly and uniformly the raw material into the stream of rotating gases which enter tangentially into the preheating shaft 1 over the gas inlet channel 4. The raw material proceeds downwards against the upstreaming rotating gases into subsequently warner zones and takes over intensively heat from the gases. The preheated material gathers in the lower part of the shaft 1 in the conical hopper 2 and is discharged through the discharge conduit 3 for further processing. The hot gases containing dust particles are in the upper part of the preheating shaft 1 sucked on by the central part of the fan wheel 5 and after passage through said wheel, deprived of the solid particles, are discharged through the gas outlet conduit 17 for further processing. The separation of dust particles from the gases in the course of their passage through the fan wheel 5 is accomplished due to the Coriolis accelerating force, which is taken advantage of in this case. The dust particles sucked on by the fan wheel 5 stick due to the action of the Coriolis force to the walls of the blades 7 and proceed in their neighborhood to the external circumference of the fan wheel 5. The proceeding dust particles together with a small part of the gases are retained in the inclined collecting channels 19, which direct the thus-retained mixture back into the operating space of the preheating shaft 1.

For cases, where for some abnormal functional composition of the treated material a one-stage separation does not prove to be sufficient, the alternatives according to FIGS. 4 and 5 and 6 and their combination is suitable.

At the alternative according to FIGS. 4 and 5 the dust containing hot gases are passing prior to their entrance into the fan wheel 5 between the separating blades 20. The dust is separated as the dust particles are at the sharp turn of the gas stream at the entrance between the separating blades 20 thrown by centrifugal force against the back of the following separating blade 20 and are repelled back into the space of the preheating shaft 1.

The dust particles from a certain size upwards never come into the neighborhood of said blades 20 due to the centrifugal force generated by the rotation of the gases and also of the separating blades 20.

The subsequent separation in the fan wheel 5 has been already described in connection with FIGS. 1 to 3.

At the alternative according to FIG. 6 three separation stages are available. The first two are described with reference to FIGS. 1 to 3 and FIGS. 4 and 5. The third stage is in the course of passage of the dust-containing gases through cyclone separators 21. The separated fraction from the separators 21 is returned into the operating space of the preheating shaft 1 via conduits 23 with closures 24. The cleaned combustion gases pass from the cyclone separators 21 to the collecting channel 22, wherefrom they are discharged through the outlet conduit 17 for further treatment.

In a combination with cyclone separators 21 without application of separating blades 20 only a two-stage separation takes place, whereby the first stage is the fan wheel 5 (FIG. 1 to 3), the second stage the cyclone separators 21 (FIG. 6).

The advantage of the proposed arrangement is the combination of the function of the kiln fan and of the dust separator. According to results of measurements, the power consumption is only slightly higher than for a normal fan required for the passage of gases. The separating efficiency is practically constant and drops only negligibly with decreasing load. By the combination of the kiln fan and of the separating device into a single unit arranged in the upper part of the shaft, substantial savings of power consumption are achieved as the separator (kiln fan) is not solely a passive power consumer. The power which is necessary to supply to the kiln fan at any rate for passage of gases through the kiln and through the preheater shaft is simultaneously used for separating.

The saving of a special kiln fan represents also savings of investment costs.

I claim:

1. An arrangement for preheating of pulverulent materials, particularly of cement raw material comprising in combination:
   a preheating shaft,
   a supply conduit for hot gases at the bottom of said shaft,
   a discharge conduit for discharge of the preheated material at the bottom of said shaft,
   an outlet conduit for gases at the top of the shaft,
   a supply tube for the treated material at the top of the shaft,
   a fan wheel with a vertical rotation axis forming the top of the shaft,
   a distributing disk, coaxial with said fan wheel and situated below said fan wheel,
   driving means for imparting a rotating movement to both the fan wheel and the distributing disk,
   the blades of said fan wheel provided with collecting channels for collecting dust particles entrained by the gases ascending the preheating shaft and returning said dust particles into the shaft space.

2. An arrangement as set forth in claim 1, both said fan wheel and said distributing disk mounted on a hollow vertical shaft, said hollow vertical shaft serving simultaneously for the supply of raw material on said distributing disk.

3. An arrangement as set forth in claim 1, said collecting channels situated near the external circumference of the fan wheel and inclined with respect to said circumference.

4. An arrangement as set forth in claim 2, with separating blades provided between the bottom of the fan wheel and the top of the distributing disk.

5. An arrangement as set forth in claim 1 with cyclone separators connected between the fan wheel and the outlet conduit for the gases at the top of the shaft.